Aug. 15, 1939.  Ö. RISZDORFER  2,169,927
PHOTOGRAPHIC FILM CAMERA WITH ELECTRIC EXPOSURE METER BUILT IN
Filed Feb. 24, 1937  2 Sheets-Sheet 1
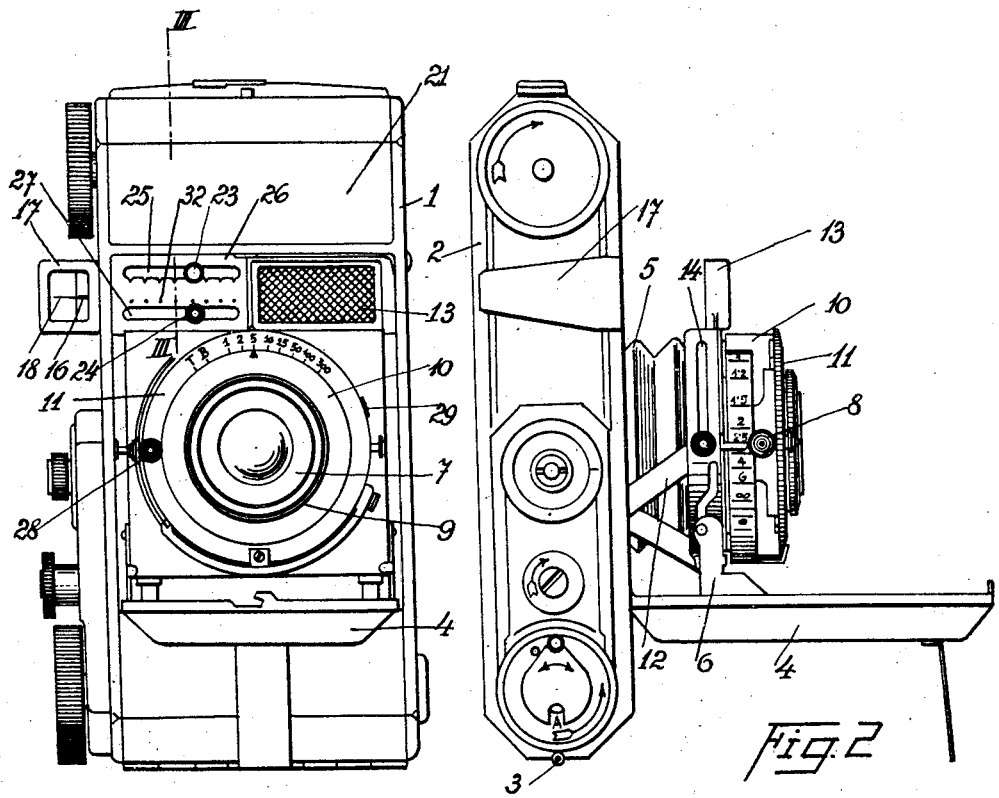
Inventor,
Ödön Riszdorfer,
By Frank S. Appleman
Attorney

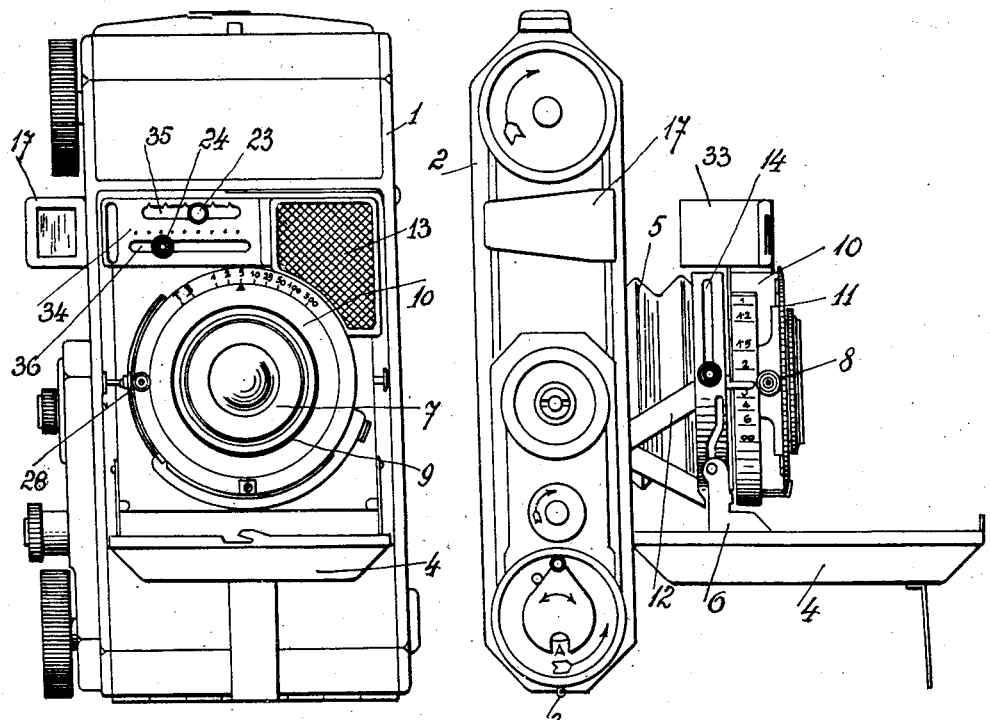
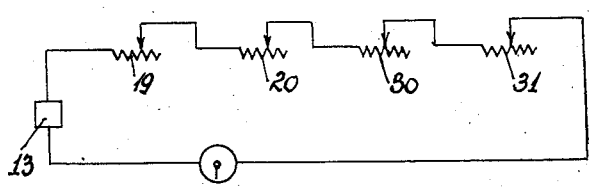
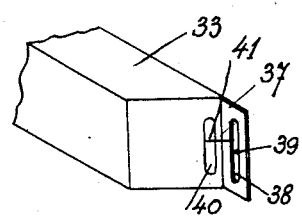

Patented Aug. 15, 1939

2,169,927

UNITED STATES PATENT OFFICE 2,169,927

PHOTOGRAPHIC FILM CAMERA WITH ELECTRIC EXPOSURE METER BUILT IN

Ödön Riszdorfer, Budapest, Hungary

Application February 24, 1937, Serial No. 127,495
In Hungary February 29, 1936

1 Claim. (Cl. 95—10)

The invention relates to a photographic film camera with electric exposure meter built-in, in which camera the object lens is arranged on a displaceable object lens carrier capable of being displaced along the length of the tilted-up camera lid, and the light bellows of which is fixed between the spool carriers of the camera.

More particularly, the invention relates to a film folding camera, in which a photo-electric cell is mounted on the object lens carrier or inside the camera casing, the casing with the cell being sunk into a recess between one of the spool boxes and the light bellows.

Two embodiments of the invention are illustrated in the drawings, of which Fig. 1 is a front elevation of the opened camera, Fig. 2 a side elevation of the same camera in opened condition and Fig. 3 a section along the line III—III of Fig. 1. Fig. 4 is a front elevation of another embodiment of the camera. Fig. 5 is a side elevation view of the opened camera according to Fig. 4. Fig. 6 illustrates diagrammatically the electric connections for both cameras. Fig. 7 illustrates a detail.

The camera casing 1 is in the usual manner constructed in such a manner as to enable both film spools to be accommodated therein, notably one of the spools above and the other spool below. For this purpose the rear wall 2 of the camera is capable of being tilted down in the known manner and is pivotable around the hinge 3. Behind the closed lid 4 there are located in the folded condition the bellows 5 and the object lens carrier 6 with the object lens superstructure. The object lens 7 is fitted in the usual manner with a diaphragm. Around the object lens frame 9 the speed regulator 10 of the shutter is arranged, the spring of the said regulator being capable of being tensioned by positioning the ring 11. The object lens carrier is held in the drawn-out position (Fig. 2) by the shear props 12.

The camera according to the invention is fitted with a built-in exposure meter. This meter consists of the photo-electric cell 13, which is accommodated in a casing mounted on the object lens carrier 14. The photo-electric cell is of square cross-section, a grid being arranged in the usual manner in front of the layer sensitive to light, as appears from Fig. 1. In the camera casing 1, which is of a slightly greater length than has been usual up to now, room is provided below the spool box 21 to enable the photo-electric cell 13 to be accommodated in the said room in the folded condition of the camera. Alongside this room for the photo-electric cell 13 a small box 22 is built into the camera casing, which box contains a measuring instrument 15 of a known type composed of a magnet and of an oscillating coil. The oscillating coil of this instrument carries a pointer 16, the end of which is, when looking through the finder 17 arranged in a lateral position on the camera, visible in the field of vision of the said finder. In the finder a zero line 18 is also provided, with which the pointer has to be brought into coincidence.

Alongside the measuring instrument 15 two resistances 19 and 20 capable of being regulated are provided in the box 22. The sliding contact 23 is capable of sliding on the resistance 19, whilst the sliding contact 24 is capable of sliding on the resistance 20. Both resistances are inserted in series with each other into the circuit of the photo-electric cell, as shown diagrammatically on Fig. 6. The button of the sliding contact 23 cooperating with the resistance 19 is slidable along a slot 25 provided in the plate 26 covering the box 22. The button of the sliding contact 24 slides along the slot 27 provided in the same plate.

The lever 8 is employed for adjusting the distance for which the camera is focused. The button 28 is the release button for the shutter. The lever 29 serves for the adjustment of the diaphragm opening. A resistance 30 is coordinated through a sliding contact to the diaphragm lever 29, whilst a resistance 31 is coordinated through another sliding contact to the adjusting ring 11 of the shutter (Fig. 6). The resistance 19 serves for enabling the sensitivity of the film emulsion employed in the given case to be taken into account. The resistance 20 serves for enabling the length of the time of exposure to be determined in those cases when the pointer 16 will fail to adjust itself to zero, even though the adjusting ring 11 is adjusted for one second. In such case a time exposure is indicated and the value of the resistance 20 in the circuit of the photo-cell is adjusted, as required for the pointer 16 to adjust itself to the zero mark 18 at which time the position of the contact 24 is a measure of the necessary exposure time. A scale having divisions corresponding to whole seconds should be provided alongside the slot 27, as shown by the series of dots 32, to translate the position of contact 24 into time units.

The Figs. 4 and 5 illustrate an embodiment, in which not only the photo-electric cell 13 but also the box 22 with the resistances and with the pointer instrument 15 are mounted on the object lens carrier. In Figs. 4 and 5 similar parts are marked with the same reference numbers. This box carries here the reference number 33. It contains, in the same way as in the preceding embodiment, the two resistances capable of being regulated. The front covering plate 34 of the box is fitted with the two slots 35 and 36 for the sliding contacts of the two resistances. The box 33 is, however, of shorter length than in the preceding example, so that the part 37 of the plate 34 projects laterally beyond the box. This projecting part of the plate is fitted with a slot 38 in which a fixed index 39 is provided. Alongside this slot 38 a slot 40 is provided in the box 33 also, through which slot the pointer 41 of the electric measuring instrument projects. If the camera is opened, as shown on Fig. 5, it is possible by aiming through the finder 17 to observe in the image field of the finder the slot 38 with the fixed index 39 as well as the pointer 41.

It will be understood that it is also possible to construct the camera described in such a manner that not only the box 22 should, as shown on Fig. 1, be arranged in a fixed position in the camera casing, but that the photo-electric cell 13 should possibly also be arranged in a fixed position, alongside the box, in the camera casing.

The described arrangement of the photo-electric cell and of the regulating resistances in a film camera possesses the particular advantage of a compact arrangement, the height dimension of the camera being the only one of its dimensions that requires to be altered, whilst neither the width nor the thickness of the camera require to be altered. The slight increase of the height dimension of the camera does not constitute any drawback, as such increase amounts only to a small percentage of the height dimension usual up to now.

What I claim is:

A photographic roll film camera having a casing provided with two spaced film spool chambers and a rectangular opening between said chambers, a folding cover plate hingedly secured to an edge of said opening adjacent one of said chambers, a movable lens carrier, a bellows connecting said lens carrier and the camera casing, said bellows being secured within said opening and along a line spaced from the edge of said opening opposite to the edge to which said plate is hinged, thereby providing a compartment within said opening and between the bellows and said second mentioned edge, an electric meter member mounted in one end of said compartment and a light sensitive cell connected to said meter and mounted on said lens carrier for movement therewith, said cell being so positioned that it moves into the other end of said compartment when the lens carrier and its bellows are collapsed into said opening.

ÖDÖN RISZDORFER.